United States Patent [19]

Anderson et al.

[11] 4,144,601
[45] Mar. 20, 1979

[54] AIR RIDE SLEEPER FOR TRUCKS

[76] Inventors: Alan J. Anderson, 6221 169th La. NW., Anoka; Anthony R. Hargreaves, 15313 Prairie Rd., Andover, both of Minn. 55303

[21] Appl. No.: 876,578

[22] Filed: Feb. 10, 1978

[51] Int. Cl.² .................... A47C 19/00; B62D 25/00
[52] U.S. Cl. ...................................... 5/118; 105/316; 114/192; 296/174; 296/190
[58] Field of Search ............... 5/118; 296/24 R, 28 C; 105/316; 114/192; 297/216, 346

[56] References Cited

U.S. PATENT DOCUMENTS

| 3,371,359 | 3/1968 | Dome | 5/118 |
| 3,612,599 | 12/1971 | Sternberg | 5/118 |
| 3,760,436 | 9/1973 | Zach et al. | 5/118 |

Primary Examiner—Mervin Stein
Assistant Examiner—Alex Grosz
Attorney, Agent, or Firm—Kinney, Lange, Westman and Fairbairn

[57] ABSTRACT

The air ride sleeper of the present invention supports a mattress or cushion. The sleeper provides cushioned movement in both a vertical and horizontal front-to-rear direction, so that the effects of bumps, vibrations, and rapid acceleration or deceleration on the person lying or sitting on the cushion are minimized. In preferred embodiments, the vertical cushioning is provided by first and second air cushions while the horizontal cushioning is provided by first and second spring-loaded slides, which slide over first and second rails and are connected to the frame by first and second variable vertical supports.

9 Claims, 7 Drawing Figures

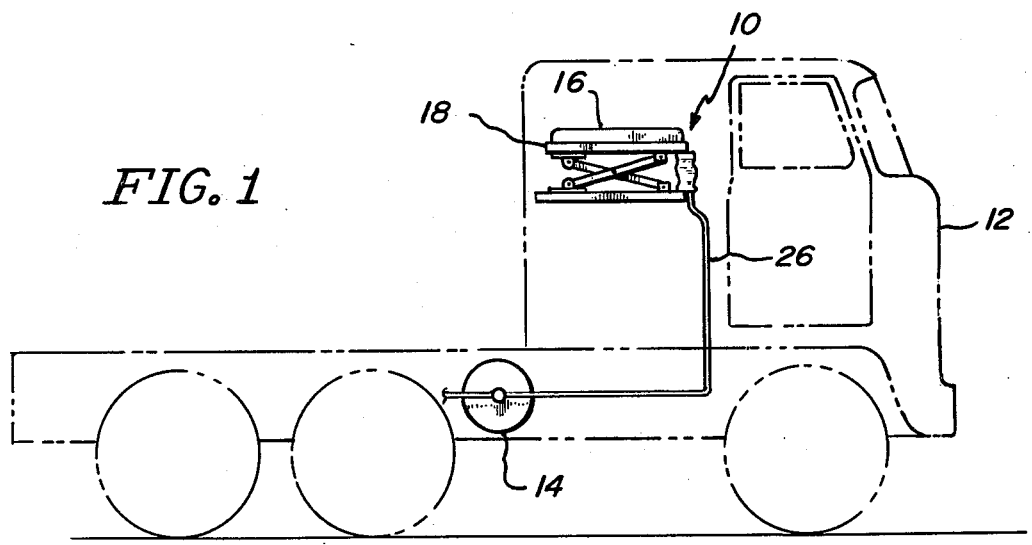
FIG. 1
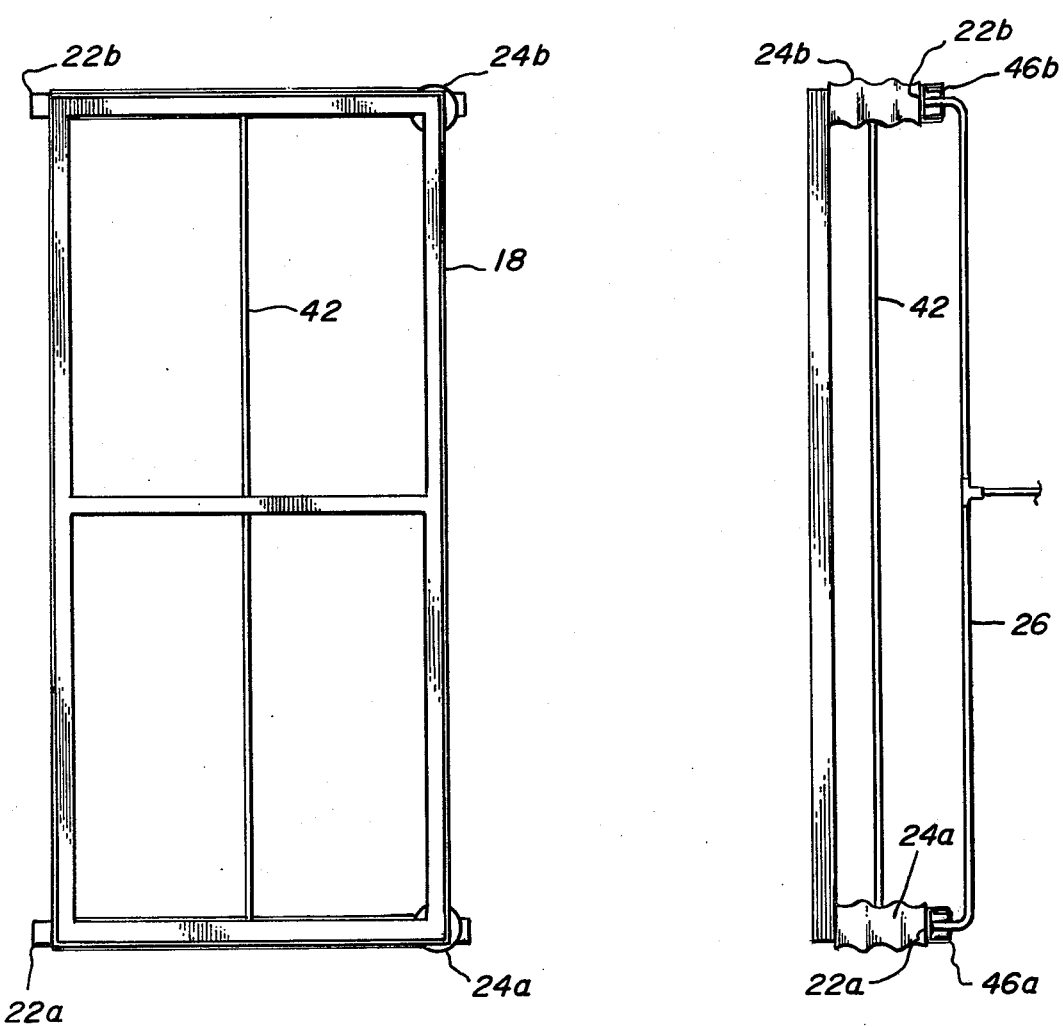
FIG. 2
FIG. 3

AIR RIDE SLEEPER FOR TRUCKS

BACKGROUND OF THE INVENTION

The present invention relates to human support systems for use in trucks. In particular, the present invention relates to an air ride sleeper useful in large, two-man truck cabs.

In larger trucks used in long cross-country hauling, two drivers often share the driving. While one is driving, the other is attempting to sleep on a mattress provided in the rear portion of the truck cab. This permits the truck to be driven more or less on a constant basis without long interruptions for sleep.

One difficulty with the prior art truck cabs is that the ride provided on the mattress is uncomfortable. Bumps and vibrations received from the road surface, as well as rapid accelerations or decelerations of the truck tend to disrupt or prevent sleep. While many individuals have found it possible to sleep under these conditions, the sleep is not particularly restful.

In the past, trucks have been equipped with air cushions under the driver's seat. Some bouncing and vibrations which otherwise would be transmitted from the truck frame up to the driver's seat are eliminated by the air cushions.

SUMMARY OF THE INVENTION

The present invention is a support system for use in the cab of a truck, and is particularly advantageous as an air ride sleeper for holding a cushion or mattress on which a truck operator may sleep. The system includes first and second rails, first and second slides, first and second variable vertical support means, and first and second air cushion means.

The frame holds the cushion or mattress and is connected to the first and second slides by the first and second variable vertical support means. The first and second slides are permitted to slide on the first and second rails, which are attached to the truck within the cab. The first and second variable vertical support means permit the variation of the vertical distance between the slides and the frame and also permit horizontal front to rear movement of the frame as the first and second slides move on the first and second rails. The vertical movement of the frame with respect to the truck is cushioned by first and second air cushion means, which are connected between the first and second slides and the frame.

BRIEF DESCRIPTION OF THE DRAWINGS

FIG. 1 shows the air ride sleeper of the present invention in a truck cab.

FIGS. 2, 3, 4, and 5 show top, front, side, and perspective views of the air ride sleeper of the present invention.

DETAILED DESCRIPTION OF THE PREFERRED EMBODIMENTS

Figure 4:
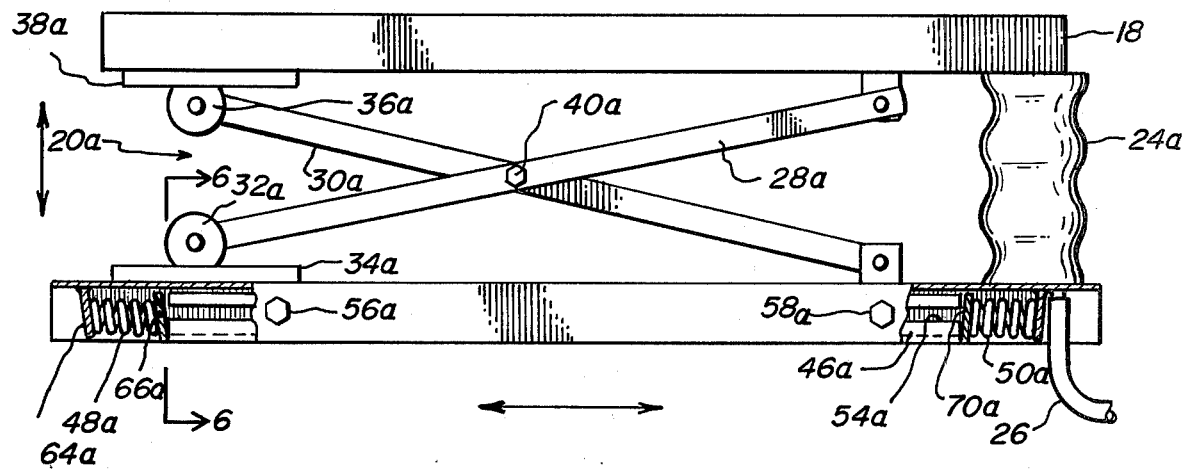

In FIG. 1, the air ride sleeper 10 of the present invention is shown within cab 12 of a truck. Air is supplied to air ride sleeper 10 from air supply 14, which also supplies air for other systems within the truck.

Air ride sleeper 10 is connected to the cab 12 and supports a cushion 16 on which a person may lie. As will be described in further detail with reference to the later Figures, the air ride sleeper of the present invention provides a cushioned ride both in the vertical and the horizontal front-to-rear direction. As a result, the person lying on cushion 16 is less apt to be disturbed by bumps and vibrations and by acceleration and deceleration of the truck.

FIGS. 2 through 5 show top, front, side and partially exploded perspective views of the air ride sleeper with the cushion removed. As shown in the Figures, the air ride sleeper includes a frame 18 which holds the cushion. At each end of the frame is a scissors type vertical support 20a and 20b, respectively. Air cushions 24a and 24b extend between slide 22a and frame 18 and between slide 22b and frame 18 to provide an air cushion support to frame 18. Air hose 26 supplies the air to air cushions 24a and 24b.

By means of the scissors-type vertical supports 20a and 20b and air cushions 24a and 24b, frame 18 is supported above slides 22a and 22b. This minimizes the effects of bumps and vibrations from the cab which would otherwise tend to bounce frame 18 and cushion 16.

Figure 5:
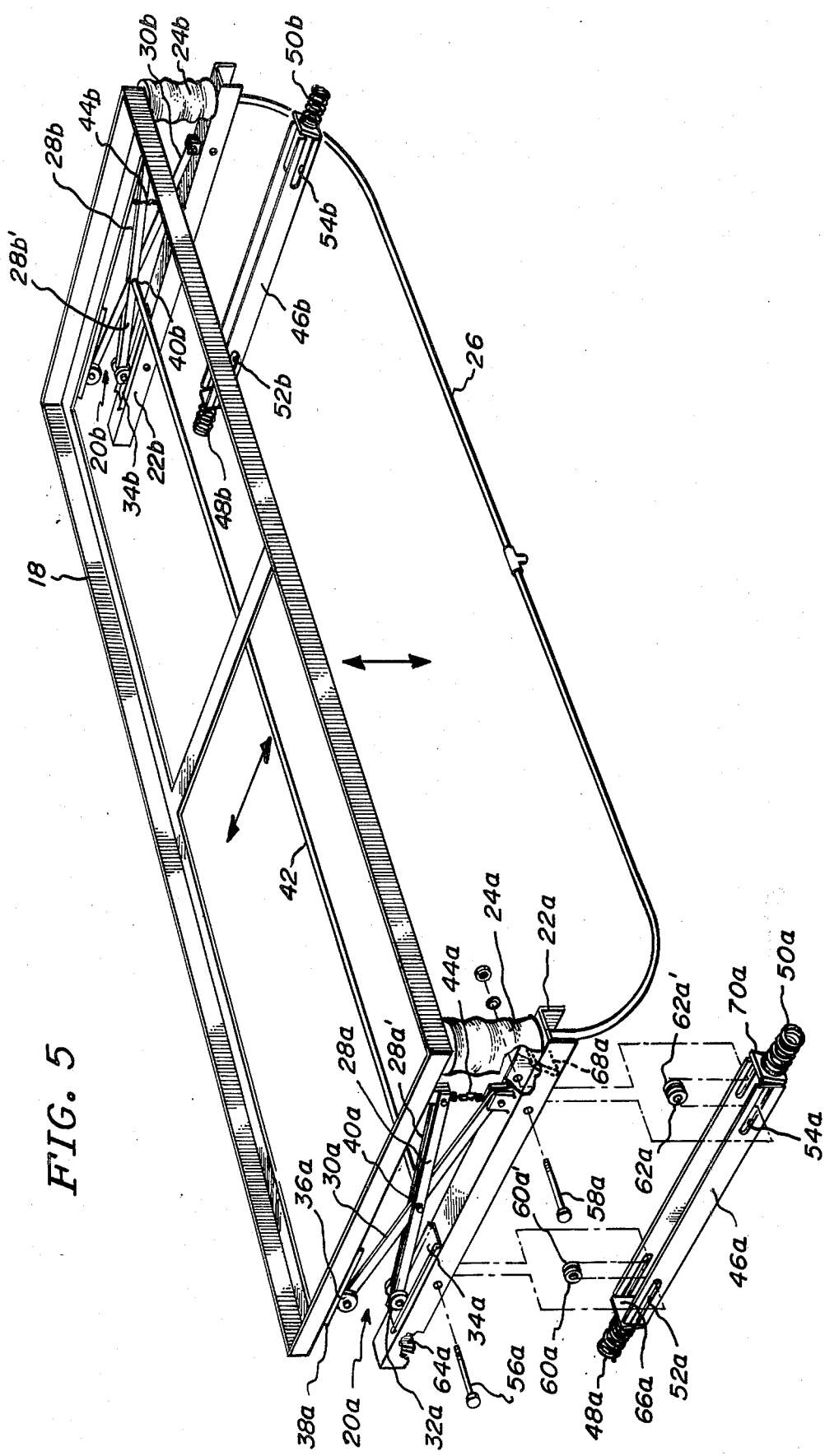

The arrows shown in FIGS. 4 and 5 illustrate the possible relative vertical movement between slides 22a and 22b and frame 18 in order to absorb the vibrations and bumps and provide a smoother ride for a person lying on cushion 16.

As illustrated in the Figures, vertical supports 20a and 20b are scissors-type assemblies. For simplicity, only support 20a will be discussed, but it can be seen that support 20b contains identical elements. At one end, scissor members 28a and 28a' of support 20a are pivotally attached to frame 18, and scissor member 30a is pivotally attached to slide 22a. Attached to the opposite end of members 28a and 28a' is a roller bearing 32a which rolls or slides in roller track 34a attached to slide 22a. Similarly, the opposite end of member 30a has rollers 36a which roll or slide on roller track 38a attached to frame 18. Members 28a, 28a', and 30a cross and are pivoted at pivot point 40a, so that the angle between members 28a-28a' and 30a will differ depending upon the amount of air pressure supplied to cushion elements 24a. It has been found that best results are achieved when a stabilizing pin or bar 42 extends between pivot points 40a and 40b of the two vertical support scissor assemblies 20a and 20b. This ensures that the two ends of the frame 18 will be supported at essentially the same height at all times. It has also been found desirable to provide chains 44a and 44b between frame 18 and the respective slide 22a or 22b to limit the vertical height of frame 18 over slides 22a and 22b. This prevents an accidental oversupply of air pressure blowing out cushions 24a or 24b.

In addition to the vertical cushioning, front-to-rear motion of frame 18 with respect to the cab 12 is provided in order to minimize the effects of acceleration and deceleration of the truck. This is provided by permitting slides 22a and 22b to slide over a pair of parallel slide rails 46a and 46b, which are attached to the frame of the truck or to some other portion of cab 12. Slides 22a and 22b slide over rails 46a and 46b so as to provide front-to-rear horizontal motion of frame 18 with respect to the fixed rails 46a and 46b. Rapid acceleration and deceleration are damped out by springs at opposite ends of each rail and slide. The springs 48a and 50a (and 48b and 50b) damp out rapid motion and prevent jarring stops when the slides 22a and 22b reach the maximum extent of their forward or rearward motion over rails 46a or 46b.

Figure 7:
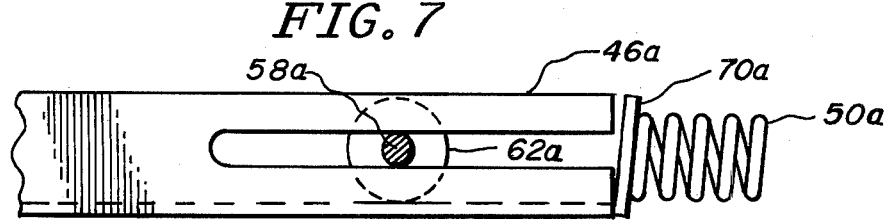
FIG. 7 is a more detailed break-away view of a portion of the rail and slide assembly.
Figure 6:
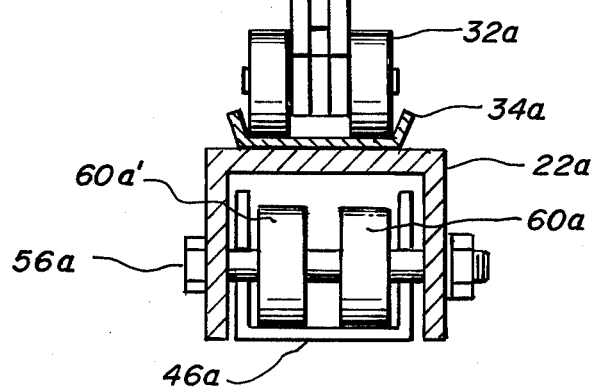
FIG. 6 is a partial sectional view along line 6—6 of FIG. 4.

FIGS. 6 and 7 show further detail of the configuration of slide 22a and rail 46a. Slide 22b and rail 46b are essentially identical. As shown in FIGS. 6 and 7, slide 22a is an inverted U channel over a smaller channel which forms rail 46a. At each end of rail 46a is a slot 52a and 54a, respectively. Slots 52a and 54a, define the maximum extent of motion of slide 22a over rail 46a. Pins 56a and 58a extend through slide 22a and each preferably has two bearings 60a and 60a' (and 62a and 62a') mounted on its shaft to permit slide 22a to roll over rail 46a.

Spring 48a is positioned between flange 64a of slide 22a and flange 66a of rail 46a. Similarly, spring 50a is positioned between flange 68a of slide 22a and flange 70a of rail 46a. Springs 48a and 50a, therefore, damp or cushion the movement of slide 22a over rail 46a to prevent jarring stops when slide 22a reaches the end of its forward or rearward movement. Limited back-and-forth movement of frame 18 with respect to rails 46a and 46b (and therefore cab 12) is thereby provided.

The present invention has successfully been used in a truck cab to provide a comfortable support for an alternate driver while he is sleeping and his partner is driving. Rails 46a and 46b are first mounted in cab 12 with the proper spacing to accept slides 22a and 22b. The remainder of the assembly is then mounted over rails 46a and 46b, and airhose 26 is connected to an air supply within the cab. Air pressure is supplied to air cushions 24a and 24b until a reasonably smooth, bump-free ride is obtained. This may involve a test drive over a rough road in order to properly adjust the air pressure in the air cushions. At that point, the assembly is ready for use.

In conclusion, the present invention is a relatively simple, yet highly effective air ride sleeper for use in trucks. In addition, the sleeper may be adapted for use as a support in a support in a bench-type truck seat in which more than one person sits. In either case, the present invention provides both vertical and front-to-rear cushioning to minimize the effects of bumps, vibrations, and acceleration and deceleration of a truck.

Although the present invention has been described with reference to preferred embodiments, workers skilled in the art will recognize that changes may be made in form and detail without departing from the spirit and scope of the invention.

We claim:
1. A human support system for use in a cab of a truck, the system comprising:
a frame for holding a human supporting cushion;
first and second rails adapted to be attached to the truck within the cab;
first and second slides for sliding on the first and second rails;
variable vertical support means connecting the frame and the first and second slides, the variable vertical support means permitting variation in the vertical distance between the frame and the first and second slides and providing horizontal movement of the frame with respect to the cab as the first and second slides slide on the first and second rails, wherein the variable vertical support means comprises first scissor support means connected between the first slide and the frame, and second scissor support means connected between the second slide and the frame, and wherein the first and second scissor support means each comprises:
first and second scissor members pivotally connected to one another at a first pivot point and having their first ends pivotally connected to the frame and to a slide, respectively, and having their second ends slidably engaging the slide and the frame, respectively; and
air cushion means connected between the first and second slides and the frame.

2. The system of claim 1 and further comprising:
spring means for damping movement of the first and second slides over the first and second rails.

3. The system of claim 2 and further comprising:
means for limiting the extent of movement of the first and second slides over the first and second rails.

4. The system of claim 3 wherein the means for limiting comprises:
slots proximate each end of each rail; and
pins inserted through the slides and through the slots, the pins and slots cooperating to define limits of movement of the slides with respect to the rails.

5. The system of claim 1 wherein the frame and the slides include slide tracks for engaging and guiding the second ends of the scissor members.

6. The system of claim 5 wherein the second ends of the scissor members have rollers attached for rolling in the slide tracks.

7. The system of claim 1 and further comprising:
connecting means connecting the first pivot points of the first and second scissor support means.

8. The system of claim 1 wherein the first and second rails are essentially parallel and horizontal within the cab and oriented to permit horizontal front-to-rear movement of the slides and the frame with respect to the cab.

9. A human support system for use in a cab of a truck, the system comprising:
a frame for holding a human supporting cushion;
first and second rails adapted to be attached to the truck within the cab;
first and second slides for sliding on the first and second rails, wherein the first and second rails and first and second slides are essentially parallel and horizontal within the cab and oriented to permit horizontal front-to-rear movement of the slides and the frame with respect to the cab;
variable vertical support means connecting the frame and the first and second slides, the variable vertical support means permitting variation in the vertical distance between the frame and the first and second slides and providing horizontal movement of the frame with respect to the cab as the first and second slides slide on the first and second rails, wherein the variable vertical support means comprises:
first scissor support means connected between the first slide and the frame; and
second scissor support means connected between the second slide and the frame; and
air cushion means connected between the first and second slides and the frame.

* * * * *